United States Patent [19]

Potter

[11] Patent Number: 5,729,659
[45] Date of Patent: Mar. 17, 1998

[54] METHOD AND APPARATUS FOR CONTROLLING A DIGITAL COMPUTER USING ORAL INPUT

[76] Inventor: Jerry L. Potter, 3251 Waterford, N.E., Canton, Ohio 44708

[21] Appl. No.: 471,787

[22] Filed: Jun. 6, 1995

[51] Int. Cl.$^6$ ................................................ G10L 9/00
[52] U.S. Cl. ................. 395/2.79; 395/2.84; 395/2.66; 395/2.67
[58] Field of Search ................... 395/2.66, 2.67, 395/2.4, 2.6, 2.84, 2.79; 364/419.08

[56] References Cited

U.S. PATENT DOCUMENTS

| | | | |
|---|---|---|---|
| 4,499,535 | 2/1985 | Bachman et al. | 364/200 |
| 4,677,569 | 6/1987 | Nakano et al. | 364/513.5 |
| 4,704,696 | 11/1987 | Reimer et al. | 364/513.5 |
| 4,942,616 | 7/1990 | Linstroth et al. | 381/51 |
| 5,111,398 | 5/1992 | Nunberg et al. | 364/419 |
| 5,274,560 | 12/1993 | LaRue | 364/444 |
| 5,321,608 | 6/1994 | Namba et al. | 364/419.08 |
| 5,335,313 | 8/1994 | Douglas | 395/2.84 |
| 5,357,596 | 10/1994 | Takebayashi et al. | 395/2.84 |
| 5,375,063 | 12/1994 | Peck et al. | 364/470 |
| 5,384,892 | 1/1995 | Strong | 395/2.52 |
| 5,386,494 | 1/1995 | White | 395/2.84 |
| 5,555,169 | 9/1996 | Namba et al. | 364/419.08 |

OTHER PUBLICATIONS

Georgianis, Computer Retail Week, "Software Business & Personal Productivity", Jan. 2, 1995.
Potter, "Problem Solving and Parallel Computing with ACE", Jan. 15, 1994.
Potter, "Associative Computing A Programming Paradigm for Massively Parallel Computers", 1992.
Winston, "Artificial Intelligence", 1977, pp. 80–84.

*Primary Examiner*—Allen R. MacDonald
*Assistant Examiner*—Vijay B. Chawan
*Attorney, Agent, or Firm*—Sheridan Ross, P.C.

[57] ABSTRACT

Oral input is used to control a digital computer. Associative searching techniques of tabular data structures are used in conjunction with rules and conventions derived from natural language to facilitate the use of oral input. The method is capable of being implemented in connection with conventional sequential computers, associative single-instruction multiple data computers and parallel processors.

27 Claims, 11 Drawing Sheets

| ATTRIBUTE (COLOR) | ATTRIBUTE (SIZE) | OBJECT |
|---|---|---|
| RED | BIG | CAR |
| GREEN | SMALL | BICYCLE |
| GREEN | BIG | CAR |
| BLUE | SMALL | CAR |
| RED | BIG | BICYCLE |

Fig. 1

```
GETNAME (start, size)
    k = 0
    for j from size to 1
        for i from start to start + j
            compare word i of word group buffer with
            column k of name association table
            k = k + 1
        if all match return success
    return fail
```

Fig. 14

|  | number | cost |
|---|---|---|
| blue shirts | 17 | |
| red pants | | | associative spreadsheet

Fig. 2A

|  | (1) | (2) |
|---|---|---|
| aa | | |
| bb | | | conventional spreadsheet

Fig. 2B

| color | object | size |
|---|---|---|
| | | |
| | | |
| | | | associative database

Fig. 3A

| color | object |
|---|---|
| | |
| | |
| | |

| object | size |
|---|---|
| | |
| | |
| | | relational database

Fig. 3B

| create | table |
|---|---|
| delete | file | display form

| create | table |
|---|---|
| delete | file | internal form

Fig. 4

| Plane 2 | | | |
|---|---|---|---|
| Plane 1 | number | cost | |
| blue shirts | 17 | | |
| red pants | | | | three dimensional named tables

Fig. 5

| create | table |
|--------|-------|
| open   | file  |
| delete | file  | command list

Fig. 7A

| 0 |
|---|
| 2 |
| 1 | hit count

Fig. 7B

| color  | size  | object  |
|--------|-------|---------|
| red    | big   | car     |
| yellow | big   | bicycle |
| red    | small | car     |
| big    | red   | car     |

Fig. 8

| the | previous object flag | current object flag | cost | size | color | object |
|-----|----------------------|---------------------|------|------|-------|--------|
| 0   |                      | 0                   |      |      |       |        |
| 0   |                      | 1                   | 24K  | big  | red   | car    |
| 0   |                      | 0                   |      |      |       |        |
| 1   |                      | 0                   |      |      |       | car    |

Fig. 9

| long term | long term income | number of years of teaching | income per year |
|---|---|---|---|
| full professor | | | |
| lecturer | | | |

Fig. 17

| | | | | | internal name |
|---|---|---|---|---|---|
| long | term | | | | table #1 |
| long | term | income | | | column #1 |
| number | of | years | of | teaching | column #2 |
| income | per | year | | | column #3 |
| full | professor | | | | row #1 |
| lecturer | | | | | row #2 |
| is | equal | | | | verb #1 |
| times | | | | | verb #2 |

Fig. 18

METHOD AND APPARATUS FOR CONTROLLING A DIGITAL COMPUTER USING ORAL INPUT

FIELD OF THE INVENTION

The present invention relates to a method and system for using oral input to control a digital computer. More specifically, the present invention relates to the use of rules related to natural language in connection with associative computing methods to facilitate the use of oral input to a computer system.

BACKGROUND OF THE INVENTION

Conventional computer user interfaces which require the input of commands or data are often difficult to use or require substantial training in order to be used efficiently.

In many cases part of the difficulty in training or use is the necessity for the user to learn and use many cryptic commands, often consisting of a single word or coined terms. While short commands and other input data may be efficient with respect to the amount of time necessary to input the data using a keyboard, such efficiencies may not significantly contribute to ease of use. This is particularly true in the case of casual users and new users, for whom the necessary training time is often a significant part of the amount of time required to use the computer to achieve a certain result.

Similar problems arise in some conventional systems when attempting to input and retrieve data. In many cases, the format and syntax of data input and data retrieval requests are arbitrary and highly structured, necessitating extensive training to efficiently use such a system. In such a system, the format of data input and retrieval may reflect arbitrary value choices made by the system designer with respect to the relative importance of data objects. While the relative value choices reflected in a program design may in fact be suitable for many users, typically the needs of some users are not efficiently addressed.

A related problem concerns computer systems which use a series of menus to enable a user to identify a desired function or option. In some cases, a user must view several menus and make several selections to reach a function or option, even if the user can, at the outset, describe what function or option is desired. While many systems allow such a user to eliminate such repetitive steps, typically such shortcuts involve additional training or implementation time, as in the case where a macro of keystrokes must be created or where a shortcut keystroke sequence must be learned.

These problems are particularly evident when attempting to control computers using oral or spoken input as a substitute for keyboard or pointer entry. Cryptic commands which may be efficient to enter using a keyboard may be difficult to pronounce or cause awkward speech patterns. For example, a user navigating through a series of menus using oral input may have to articulate a string such as "two - enter - (pause) - four - enter - (pause) - one - enter - (pause) - one - enter" in order to reach a desired function. Similarly, a request to find all files in a database which relate to ABC may require articulating a phrase such as DIR C:\MYDIR\*.ABC or "D - I - R - space - C - colon - backslash - M - Y - D - I - R - backslash - asterisk - dot - A - B - C - enter."

In some cases the problems are ergonomic. User interfaces which require the user to know how to type and use a mouse or other pointer require a degree of manual dexterity. In addition, input of rows and columns of data from reference material using a keyboard requires considerable attention to maintain one's place visually, and shifting of hands and eyes to use a mouse costs considerable time, as well as the need to refocus on the input data.

Therefore, an easily learned method for controlling a digital computer using oral input is needed.

SUMMARY OF THE INVENTION

The present invention provides a method and apparatus for controlling a digital computer using oral input, such as spoken commands. The training time and amount of study which is required to effectively use the system is less than that required by conventional systems since the invention allows users to control the computer using spoken phrases which are very similar in structure to the structure of a natural language the user may use in oral communication with another person.

The present invention uses oral input, natural language based rules, associative searching and tabular data structures to provide an easily learned means for controlling a digital computer. Natural language, as used herein, refers to the vocabulary, rules and conventions which make up a commonly understood language, such as English or German. The invention employs rules and conventions derived from natural language rules and conventions to identify and implement the desired effect of a oral command given to a computer system. Since such rules and conventions are generally known to users of the natural language, users do not need extensive training to learn alternative requirements of a particular computer system.

The present invention employs a means for receiving oral input connected to a digital computer. The oral input is, in its most basic form, a word group that describes one or more objects and indicates an action to be taken with respect to the objects. A word group may be comprised of multiple individual words, and may include phrases and clauses. Generally, a phrase is a group of related words. A clause is a group of words containing a subject and a predicate. The general form of a word group is analogous to the structure of a sentence in the natural language which is being used, such as a verb followed by a noun phrase in a system based on the English language.

The oral input is received by a microphone and converted to digital input information representing each word of the oral input by a voice recognition device. The input information is then used to associatively search the contents of a tabular data structure organized in rows and columns. The row or rows which contain the largest number of data elements equivalent to the elements of the word group are identified. For each such row, the input information is then analyzed to determine the content information of the words. Content information is determined by the use of information regarding the position of a word or phrase relative to the other words or phrases, the use of rules derived from syntactic and semantic rules and conventions of the written and spoken natural language and the use of information derived from the tabular data structure. The syntactic content information which is generated may include classifying words and phrases as parts of speech, such as verbs, nouns, adjectives, pronouns, prepositions and particles; phrases, such as noun phrases, prepositional phrases, and verb phrases; or clauses, including independent and dependent clauses. The semantic content information may include information relating to the classification of the word (i.e., the word "red" is a color) which is derived from the tabular data structure as well as information relating to the possible meaning(s) of each word.

Associative searching is a technique of accessing or identifying an entire datum from a body of data by specifying any portion of the datum. In the present invention, one advantage of the use of associative searching is that a thing or object may be identified or accessed merely by describing it using natural language words, in a manner similar to that used when describing something using natural language. Therefore, it is not necessary for the user to determine and input an address, or point at a visual representation, in order to identify or access a data element or object, or to specify an action.

As used herein, a tabular data structure is a structure comprised of rows and columns. Each row and column may have a label associated with it. The tabular data structure allows for the data elements which uniquely identify an object and its attributes to be stored in a row which retains the association between the elements. The use of tabular data structures also permits the use of pronouns to identify or access previously identified objects or groups of objects. In addition, associative searching and tabular data structures facilitates the use of oral input in forms other than the rigid syntax forms typically required in conventional text based systems and in written grammar.

Tabular data structures are particularly well suited to organization of data which is described in a natural language manner due to the ability to store, retrieve and display the data in a structure which is similar to that used in a natural language description of the data. Although the tabular data structure may be mapped onto a conventional sequential memory device, it may also be efficiently mapped onto an associative memory device or onto the memory of a single-instruction multiple data (SIMD) associative computer. The latter two devices both allow direct parallel processing.

An apparatus for implementing the method is also provided. The basic elements of the apparatus are a device for receiving oral input, a word recognition device, a display capable of representing the oral input in text form, a content generator for the generation of content information, a storage device, a search device and a processor. The apparatus also includes an audio generator, a speech synthesizer and speaker for verbal output to the user. The word recognition device, content generator, audio generator, speech synthesizer, storage device, search device and processor may collectively or selectively be combined in a programmed digital computer. The digital computer may take the form of a conventional sequential computer, a sequential or parallel processor used with an associative memory, a single-instruction multiple-data (SIMD) computer, or a computer network, which may be heterogeneous or homogeneous.

The invention may be used in connection with various applications, including operating systems, databases, spreadsheets, word processors and programming. The use of oral input avoids many of the problems associated with the use of keyboard and pointing devices and provides an easily learned method of operating and controlling a computer or computer network. The invention accommodates the use of oral input which differs in syntax from written grammar or the arbitrary formats used in some computer input applications. This flexibility allows a user to use speech patterns similar to those used in everyday conversation, which may differ from the rules of written grammar. When the invention is implemented using a speech synthesis output device, a conversational mode of operation may be used.

The invention may be adapted for use with a variety of hardware configurations, including sequential memories, associative memories, conventional processors and parallel processors. In addition, the invention may be adapted for use in connection with a variety of applications where a digital computer is used to control processes or apparatuses, particularly in situations where use of keyboards and pointing devices is impractical or inconvenient.

Some of the objects and advantages are clearly identifiable from the above description of the present invention. Other objects and advantages of the present invention will be set forth in part in the description and drawings which follow, and, in part, will be obvious from the description or may be learned by practice of the invention. The present invention is hereafter described with reference to the following drawings, in which reference numerals denote like elements throughout.

BRIEF DESCRIPTION OF THE DRAWINGS

FIG. 1 is an example of a tabular data structure.

FIG. 2A is an example of a tabular data structure for use in spreadsheet applications.

FIG. 2B is an example of a conventional spreadsheet data structure.

FIG. 3A is an example of a tabular data structure for use in database applications.

FIG. 3B is an example of a conventional relational database data structure.

FIG. 4 is an illustration of the form of a display of a command list and its corresponding tabular data structure.

FIG. 5 is an example of multiple two-dimensional tabular data structures arranged in a three-dimensional structure.

FIG. 7A is an example of a brief command list in a tabular data structure.

FIG. 7B is a representation of the results of a search of a tabular data structure.

FIG. 8 is an example of a database stored in a tabular data structure.

FIG. 9 is an example of a tabular data structure for use in connection with pronoun references.

FIG. 14 is an example of a routine for comparing input information to names in a tabular data structure.

FIG. 17 is an example of a user developed table.

FIG. 18 is an example of a tabular data structure containing names.

DETAILED DESCRIPTION

Figure 6:
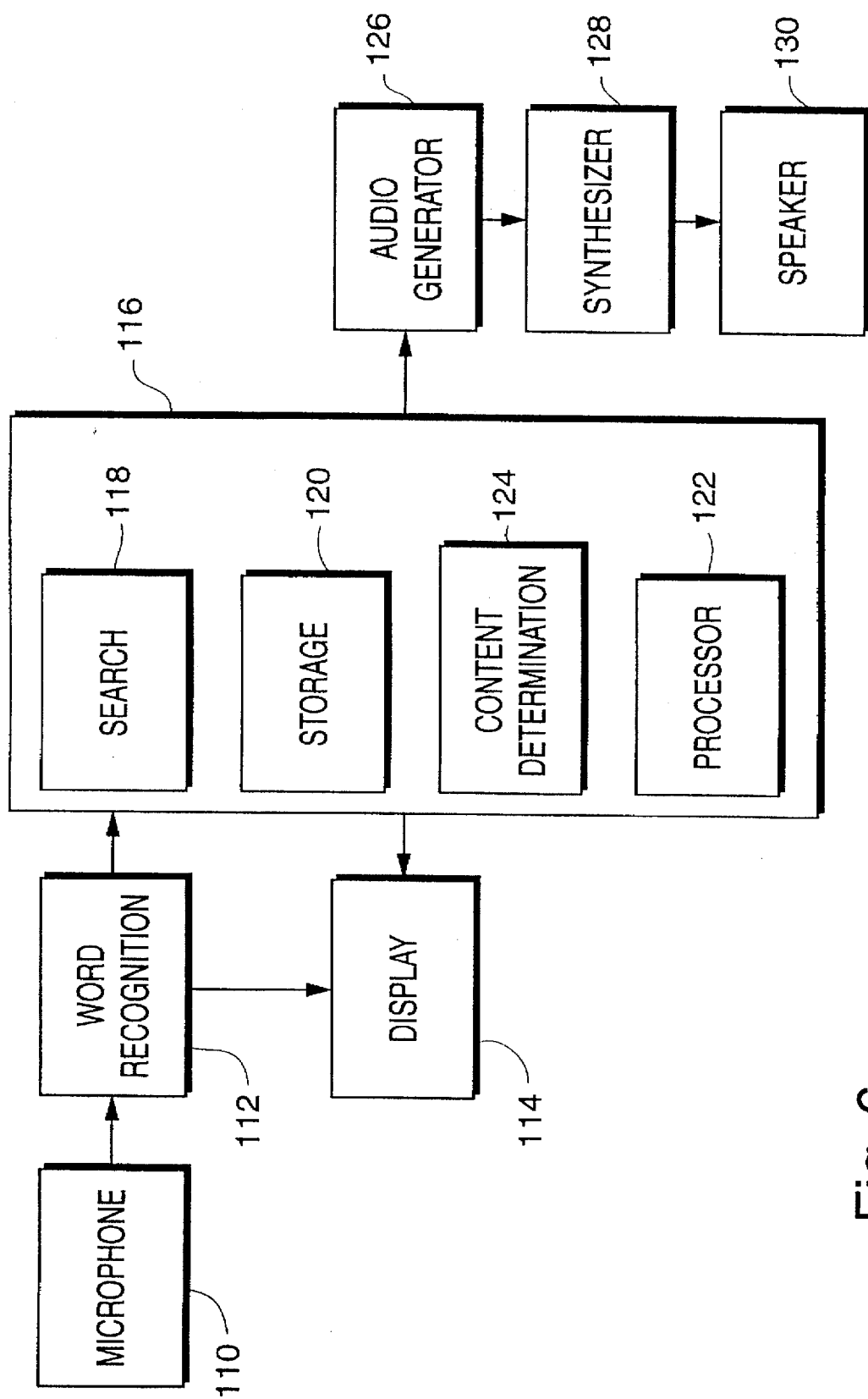
FIG. 6 is a block diagram of the major components of an apparatus according to the present invention.

The present invention uses the rules and concepts of a user's familiar natural language to reduce the training time and the time and effort that would otherwise be necessary for the user to use a computer system effectively. Although the invention is described herein with reference to the English language as the natural language, the invention may be implemented with reference to various different languages.

A natural language, such as English, has rules and conventions relating to spoken and written phrases or sentences. The rules and conventions of the language provide contextual information which assists a person who is hearing another person speak in that language to understand the intent of the speaker. Natural language rules and conventions may include formal grammar rules and informal rules and conventions commonly employed in both written and spoken language.

While a given word in a language may have a single definition or multiple definitions, the relationships between that individual word and the other words in a spoken sentence provide the receiving party with the additional information necessary to infer the intent of the speaker. For example, a convention in English is that each complete sentence contains both a verb phrase and at least one noun phrase. The verb phrase identifies an action and the noun phrase identifies an object. In this context a "phrase" may be a single word or a group of associated words. Therefore, in the sentence "Find the big red cars" the phrase "the big red cars" is recognized to be a noun phrase and the word "find" is recognized to be a verb phrase, indicating action to be taken with respect to the identified group of cars, despite the fact that in other contexts the word "find" might be used as a noun. Similarly, from the positions of the words "big" and "red" relative to the word "cars" it is understood that the two words modify the noun "cars" by limiting the group of described objects to those cars which are both big and red. Another applicable rule is that plural nouns refer to multiple objects, indicating that the plural form "cars" refers to a group.

Once learned, natural languages enable a speaker to easily convey a great deal of information. Speaking is typically the easiest way for a person to express a thought, and the inferences which may be derived from the associations between spoken words allow communication of complex ideas using relatively brief sentences or phrases. The present invention uses rules derived from such natural language rules and conventions to both infer the meaning of spoken input information and to facilitate the organization of data. The similarities to natural language make the invention easy to assimilate and use. The primary aspects of natural language which are used in the present invention are the use of associations between words to identify the intended meaning, the use of verb phrases to identify desired actions, the use of noun phrases to identify objects, and the use of pronouns to refer to previously identified objects.

The use of the descriptive capabilities of natural language in connection with the present invention allows a computer user to directly access data or execute functions merely by describing them or naming them. The ability to directly describe and execute a desired function allows a user to avoid sequentially viewing and selecting options in a series of displayed menus. Further, the ability to describe data or functions using natural language phrases avoids the necessity of attempting to articulate cryptic commands and characters such as :, \, *, and other special text characters commonly used in conventional systems.

The use of the descriptive aspects of natural language also enables the efficient use of tabular data structures to organize data. Tabular data structures are organized into rows and columns. The relationship between elements of a row reflects the association between an object and its attributes in a manner similar to that employed when describing an object using spoken natural language. Descriptors which are used in natural language, e.g. adjective and adverbs, may be treated as attributes of the object being described. In the example used above, "big" and "red" are descriptors and "car" is the object. The identified attributes associated with the object are thus size (big) and color (red). The association of an object and its attributes may be represented by a row in a data structure containing entries for each attribute and the object. The row of the data structure for a "big red car" would thus contain a size attribute having the value "big," a color attribute having the value "red," and the object "car." The columns of the tabular data structure are thus established by attribute type and object type. If there are many objects sharing the same attributes, data describing the objects may efficiently be organized into a tabular structure, where each row reflects an object and its attributes and each column is the location of an attribute type.

An example of a tabular data structure is shown in FIG. 1. An important feature of the associations represented by the tabular structure shown in FIG. 1 is that the combination of the attribute values and the object in each row uniquely identifies the described object. Therefore, a large number of objects may be uniquely represented in a tabular data structure simply by providing enough attribute types (columns) in the structure. Although FIG. 1 and the examples used herein generally describe a two-dimensional table structure, it will be appreciated by those skilled in the art that multiple tables may be used and multiple tables may also be arranged in a three-dimensional structure, as shown in FIG. 5.

Tabular data formats have been used in many computer applications, including spreadsheets which use two dimensional tables with row and column labels, database tables with column labels only, and n-dimensional arrays of data for scientific data using mathematical matrix notation, such as aa[i][j]. Typically, these data formats are address based and the location of an element is specified by an address in a one dimensional sequential memory.

The present invention uses associative searching techniques to identify and locate data in a tabular data structure, allowing implementation of the invention in both sequential and associative memories in a manner which does not require specific addresses. Associative searching eliminates the need for pointers, linked lists, sorted data and other complex data structures which are required by sequential processors for fast, efficient data processing. Tabular data structures may be dynamically modified at run time. The invention may also be implemented using parallel processing.

The invention integrates the tabular formats so that they can be used as general data structures for storage and processing of information of various types using associative searching and parallel processing techniques. The use of tabular data structures and associative techniques allow the invention to be used in a variety of applications. In particular, database, spreadsheet and word processing applications may be completely integrated with the only distinctions between these applications being 1) the type of table and data in the table, 2) the type of access appropriate for the table and 3) the style of programming. As an example of the integration, a database application can be used to input and store information which can be retrieved and processed using a spreadsheet application. No data conversion is needed since all of the data is stored in a tabular data structure. Associative searching of tabular data structures may be used in both the processing of auditory input and in connection with databases, spreadsheets, command programs (e.g., operating systems), computer programming languages and word processing.

The present invention also facilitates the use of parallel programing. Parallel programming, as used herein, refers to a style of programming, rather than simply the hardware upon which it is executed. Parallel programming requires that the program be separate from the data. This allows various techniques and styles to be used to access the data. A fundamental aspect of parallel programming is the use of massively parallel searching, instead of address mapping, to find data. Parallel programming is relatively simple to learn and use because it uses the brute force of massive parallelism to search simple unsorted tabular data structures.

The use of parallel programming with the invention may be implemented on any type of conventional sequential or parallel computer or network of such computers with conventional or associative memory. However, considerable speed and/or cost benefits are possible if the underlying hardware is SIMD in nature.

The invention facilitates the use of parallel programming by allowing massive associative searching of unordered data stored in tabular data structures. Ease of use is promoted as a result of the similarity in structure to natural language as well as to that of commonly used tables and charts.

FIG. 2A illustrates an example of a tabular data structure according to the present invention of the type suitable for use in a spreadsheet application. Using associative searching, the desired data element may be identified by describing it using the row and column labels, e.g. "the number of blue shirts" or "blue shirts, number of." This structure also allows identification of entire rows or columns. In contrast, FIG. 2B illustrates a conventional spreadsheet labeled with map coordinates. Individual cells in the table are referenced by use of these coordinates (e.g., aa-(1)) or interactively by a mouse. Parallel access to entire rows, columns or tables is typically not provided. While some conventional spreadsheets allow names instead of map coordinates, a data element is typically selected by use of a pointing device.

The second type of tabular data structure which may be used in present invention is a chart, as illustrated in FIG. 3A. Charts have column labels but no row labels and may be used in database applications. These tables may be accessed not only by specifying column names, but also associatively by describing the contents. An alternate form of chart, where the labels are specified as shown in FIG. 9, is also useful for database applications. In contrast, a type of data structure conventionally used in databases is illustrated in FIG. 3B. These structures are often organized hierarchically and require special mathematically based relational database access methods using the name of the columns and tables and the desired contents to determine the address of a specific data element. While some databases have the capability to translate quasi-natural language input into mathematical expressions in order to identify data elements, such databases are also typically address based. In addition, the ability to translate the input is often dependent on compliance with rigid syntax or format rules which strictly limit the acceptable forms of input structure.

FIG. 4 illustrates an example of a display format corresponding to a tabular structure. The display may be a list of commands or other textual matter. Internally, the words are stored in a corresponding unlabeled tabular data structure, which is suitable for use in connection with processing general text, as in natural language processing and word processing applications. In contrast, conventional word processors and parsers use strings, rather than tabular data structures, to store textual information.

FIG. 5 illustrates a three-dimensional data structure according to the present invention. The three-dimensional structure is comprised of a plurality of two-dimensional tabular data structures which are logically "stacked up" to form three dimensional tables. The third dimension of the table structure may be accessed either by specifying a table name or associatively, by describing its content. It will be appreciated that each of the tabular data structures according to the present invention, including those discussed above, are embodiments of the general tabular data structure. As such, even though certain forms of tables may be preferred for certain applications (i.e., labeled tables for spreadsheets), all forms may be used for all functions where appropriate or desirable.

The tabular data structure is a convenient method for storing and displaying information due to its similarity in structure to the way natural language descriptors and objects are used to identify an object. In addition, the tabular data structure may be efficiently mapped onto associative memory devices and memory devices of associative computers.

FIG. 6 illustrates a block diagram of an apparatus according to the present invention. Microphone 110 is a conventional microphone capable of receiving the oral input and converting the sound waves into corresponding electrical signals. The word recognition device 112 receives the electrical signals from the microphone 110 and converts the signals into input information, which is a digital data stream representing the words comprising the oral input. Suitable word recognition devices, such as the Soundblaster Model SB 1759 are commercially available. Display device 114 may receive input information from the word recognition device 112 and display text representing the input information. Display of the input information after processing by the word recognition device 112 allows the user to determine if the input is accurate. In one embodiment, the user may be required to confirm the accuracy of the input information by additional input prior to further processing.

The word recognition device 112 is connected to a digital computer 116. Operating within the digital computer are a search device 118 for associatively searching a tabular data structure; a storage device 120 for storing data in a tabular data structure; a processor 122 and a content determination device 124. Although these four devices are shown as incorporated within a digital computer in FIG. 6, it should be appreciated that a number of different physical configurations are possible.

The content determination device 124 determines the content of the elements of the input information. The resulting content information identifies the verb phrases, noun phrases, and parts of speech such as nouns, verbs, adverbs, adjectives, pronouns and articles, which are present in the oral input. Typically, input information comprises noun phrases, nouns, adjectives and pronouns describing a object, a function, or a group of either objects or functions. Such descriptors may refer to existing data stored in a tabular data structure, new data to be stored in the data structure or indicate the locations where data is to be stored following a processing operation.

Content information may also be used to identify an operation to be performed on certain data. The operation relates to the parts of the input information which are identified as action elements, such as verbs and verb phrases or clauses.

Occasionally, it may be desirable to output questions, answers and other communications to the user. In one embodiment, such information may be displayed by using display device 114. Such information may also be communicated audibly to the user by using speech synthesis and an audio output device such as a speaker. Audio generator 126 generates the audio information to be output, which is sent as character strings to the speech synthesiser 128 which generates the necessary output signals for the audio output device 130 to output audible speech. Audio generator 126 and speech synthesizer 128 may operate in the digital computer. Audio output may be particularly useful in applications where visual display may be impractical or inconvenient.

The processor 122 may be a conventional CPU, such as an Intel 80486. The storage device 120 may be any memory device capable of storing data in a tabular data structure. Data may be processed by the processor 122 and the results stored in the storage device 120, displayed using the display device 114 or audibly output through output device 130. The processing operation to be used is identified by the portion of the input information which is identified by the content as requesting action, such as a verb or verb phrase.

Content information may be generated in a variety of ways. The simplest method is to simply assign a single identifying label to each word of a limited vocabulary represented in a tabular data structure. The identifying label then is used to determine the content information. For example, the word "find" may be defined to always be a verb regardless of how or where it is used, despite the fact that in natural language English the word "find" may be used as both a verb and a noun. A single entry may be specified for each word in the vocabulary which is recognized by the word recognition device. Using this method, the content determination device 124 determines the content information simply by assigning the predetermined identifying label to each word of the input information. In this embodiment, verbs are always used to specify actions, and adjectives and nouns always describe objects.

While this approach has the benefit of simplicity, a more general approach uses associative searching. Associative searching is particularly useful in connection with oral input, as it allows input information to be expressed in various ways, in contrast to the rigid format and syntax requirements of conventional systems which purport to be based on natural language. Since spoken language is often not consistent with the traditional rules of written grammar formats, the reduced reliance on rigid syntactical rules permitted by the present invention provides a method which is less restrictive and relatively easy to learn.

In one embodiment, a tabular data structure in the form of a list is used to generate content information for applications, such as operating systems, which predominately use a restricted set of commands. FIG. 7A illustrates a brief example of such a tabular data structure. The associative information generated by the search in this embodiment is a count of the number of words the input information and the commands in the list have in common, or "hit count". For example, the command "open file abc" would cause the hit count shown in FIG. 7B. The command with the largest hit count is processed first. If several commands have the same hit count, the first one is selected. However, this manner of ordering the selection of commands having equivalent hit counts is purely arbitrary and it will be appreciated that alternative methods of ordering may also be used. For example, the initial count of certain commands may be advanced so that they will be selected in preference to other commands.

Each command has associated with it a set of parameters which are required for the execution of that command execution. When a command is selected using the hit count, a routine is called which extracts the parameter information from the input information using syntactic, semantic and associative techniques. If all of the parameters are not available, the "next best" candidate command is selected and processed. When a command is found whose parameter list is satisfied, the command is executed. If none of the relevant parameter lists are satisfied, the user may be prompted to input additional information.

Another embodiment of the invention relates to spreadsheets and similar applications and uses labeled tabular data structures. An example of such a structure is shown in FIG. 2A. In this embodiment, the names of the rows, columns and tables can be combined in various ways to identify individual cells, rows or columns of cells, or one or more tables of cells to be processed by the individual commands. While multi-word labels may be used in a variety of embodiments of the invention, they are particularly useful in a spreadsheet application.

Referring to FIG. 2A, in a conventional system where input is restricted by syntactical rules or rigid formats, it might be necessary to input the exact phrase "number blue shirts" in order to identify the cell containing the entry "17". Any other form would be rejected. However, using the associative searching of the present invention, any form of input which describes the object would be acceptable. The associative approach is to accept the input as long as it can be understood. In this context, "understood" means that a unique object (i.e., cell, row, column or table) can be identified. Thus "number of blue shirts" and "blue shirts number of" would both be acceptable inputs. While the latter might not be an intuitive grammatical choice, it is illustrative of the principle that the present invention permits the use of alternative forms of oral input. As such, it is easier to use than conventional rigid formats and is better suited for use with language as commonly spoken.

Although input is not restricted to a single format, rules based on natural language are still used. The basic rules, however, may be quite limited. In one embodiment, the only rules are:

1) Each word group must contain a single explicit verb phrase and at least one noun phrase or prepositional phrase.

2) Verb phrases, prepositional phrases and noun phrases may be in any order in the word group, but all words in a phrase must be contiguous.

In this embodiment, all words and multi-word sequences, such as column and row names, are stored associatively in the tabular data structure. All possible word sequences of the input information are processed—longest first. Each word sequence is processed using associative techniques to determine if it is recognized. If not, the next longest sequence is input. When a sequence is recognized, it removed from the input sequence and all relevant associative information is attached to it.

The remaining input sequence is processed in the same way as above until all sequences have been identified. The routine associated with the verb is called with the other recognized word sequences as parameters. In this manner the word sequences "number of blue shirts", "blue shirts number", "number blue shirts" and "blue shirts number of" will be recognized as identifying the same cell of FIG. 2A.

One example of this approach is when the input information contains a verb and a list of objects. The verb corresponds to a subroutine for processing and the list of objects to the parameters of the processing operation, which may be identified in a tabular data structure by a table name, a column name and a flag vector flag marking the responding rows. FIGS. 11, 12, 13, 14, 15 and 16 illustrate the flow of processing in one embodiment of the invention. The general flow of processing is as follows.

Initially, the input information is converted to a standard form. Next, a word group, or phrase, corresponding to a noun phrase, verb phrase or prepositional phrase which is contained in the input information is extracted. If the word group corresponds to a noun phrase or a prepositional phrase, the words of the phrase are stored in a buffer, FIG. 12. The contents of the buffer are then compared, FIG. 13, to the table, column and row names in the tabular data structure to determine if the words in the buffer match a name in the tabular data structure, FIG. 18. The comparison is made "longest first," which means the entire word group is initially compared to the names to determine if there is an exact match. If not, the maximum length of the word sequence which is to be compared to the names is incrementally reduced and then compared until a match is found or no words remain in the buffer, FIG. 14. If a match is found, the remainder of the buffer is similarly processed. If a match is not found for the remaining words in the buffer, the maximum length of the word sequence which is to be compared to the names is reduced and the process restarted.

Figure 11:
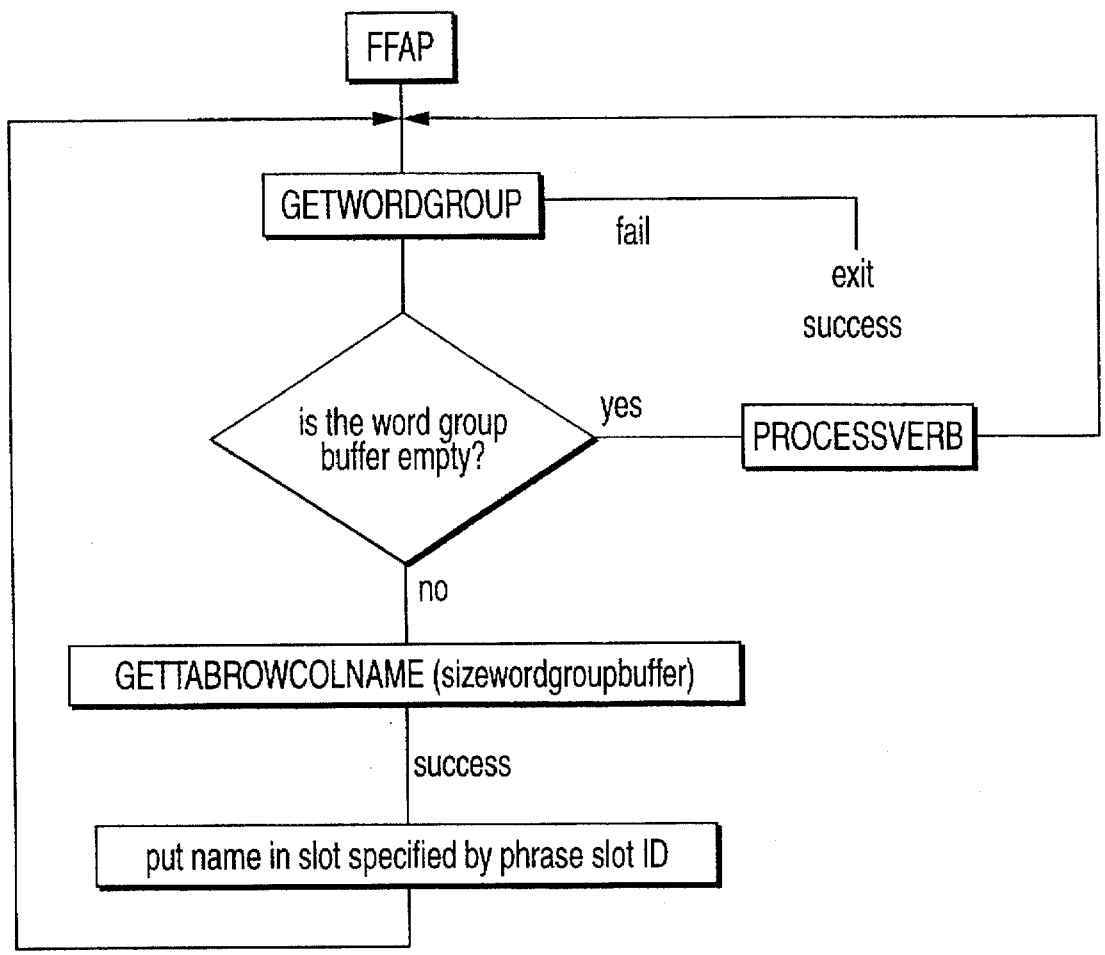
FIG. 11 is a flow diagram of processing of input information.

Verbs are not loaded into the buffer, FIG. 11. When a verb is identified, the processing flows to a separate routine shown in FIG. 16, where the words of the verb phrase are located and the verb is placed in the appropriate action slot. An application of general process flow is demonstrated with reference to FIGS. 17 and 18. FIG. 17 shows a table created by a user who wishes to process some data relating to a full professor and a lecturer. The user knows that information is available with respect to the "number of years of teaching" and "income per year" and is interested in "long term income." Accordingly, he creates a table with "full professor" and "lecturer" as row names and "number of years of teaching," "income per year" and "long term income" as column names. The name of the table is "long term." Although not shown in FIG. 17, the table might also be created with data in the empty boxes, e.g. 50,000 in the "income per year" column in the "full professor" row.

FIG. 18 shows data from the user's table of FIG. 17 stored in a tabular data structure as the result of compilation of the information in FIG. 17. After the tabular data structure of FIG. 18 is established, the user may establish the relationship by saying "The long term income of the full professor is equal to the full professor's number of years of teaching times his long term income per year." After the corresponding input information is generated, the input information is converted to the standard form "The long term income of the full professor is equal to the full professor(plural) number of year(plural) of teaching times his long term income per year."

The processing is generally straight forward, but does contain some ambiguities. For example, the sequence "long term income" appears in two places with different meanings in the input. When scanning left to right, the words "long term" match both the table name "long term" and the initial part of column name "long term income" in FIG. 18. Secondly, the possessive "of" in "the long term income of the full professor" is part of a possessive construction, as opposed to the "of"s in the column title "number of years of teaching" which are possessive but are a part of the name. Thirdly, the construction "the number of years of teaching of the full professor" contains both types of "of." Finally, the statement also includes a possessive pronoun ("his salary per year.").

Grammatically, the statement is (noun phrase)—(verb phrase)—(prepositional phrase). However, in this embodiment standard parsing is unnecessary and the only structural analysis needed is to divide the standard form of the input information into word groups delineated by articles, prepositions and verbs.

Figure 12:
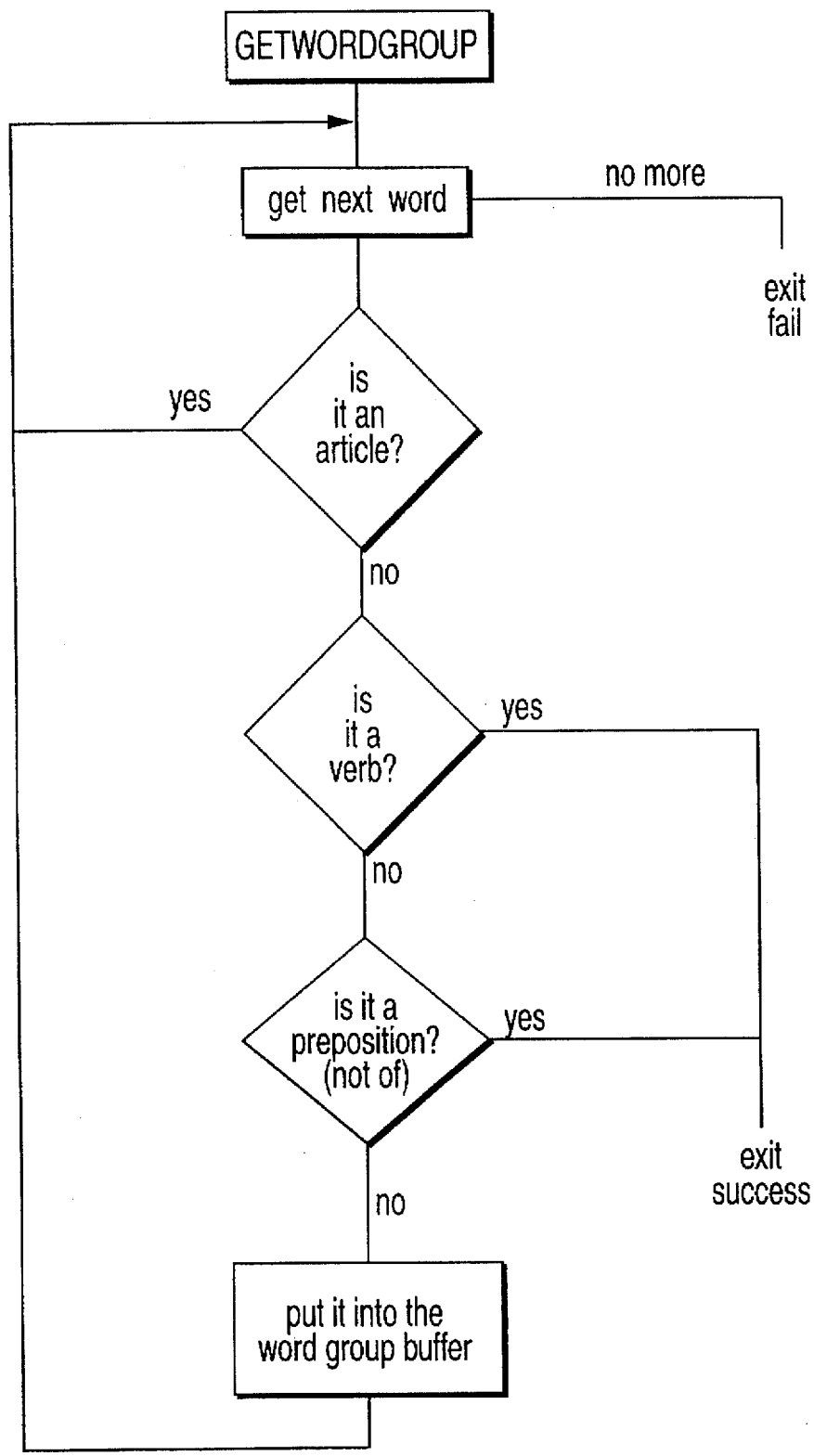
FIG. 12 is a flow diagram of a routine for extracting word groups.
Figure 16:
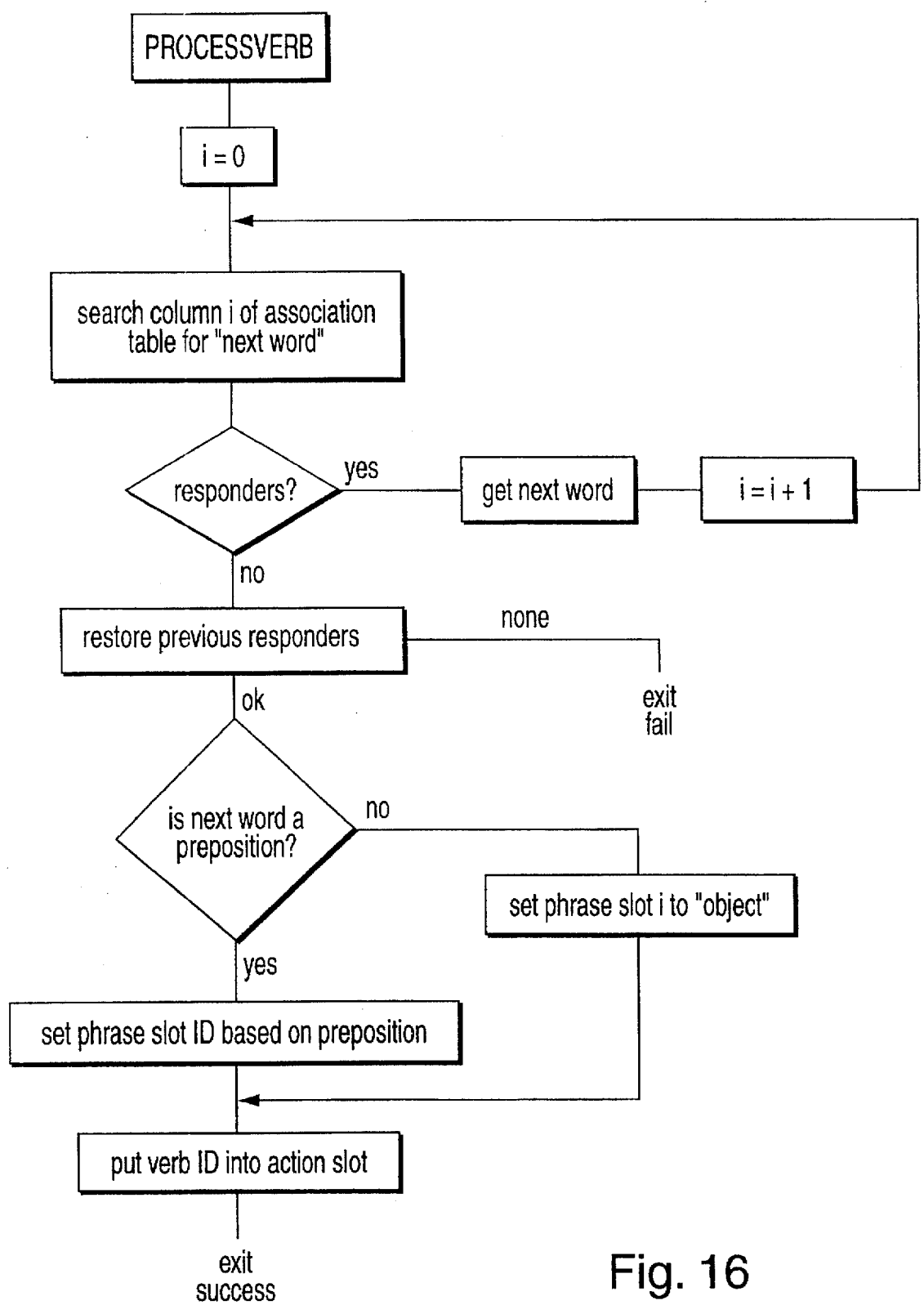
FIG. 16 is a flow diagram of a routine for processing verbs.

Processing of the standard form information flows according to FIG. 11. The word groups which are extracted and put into the buffer by the GETWORDGROUP routine shown in FIG. 12 are, in order, "long term income of full professor," "full professor(plural) number of year(plural) of teaching," and "his long term income per year." Referring to FIG. 11, after processing a word group, the FFAP routine saves the table, column and row flag vector names in the appropriate slot and searches for the next word group. An empty word group buffer from the GETWORDGROUP routine indicates a verb sequence in the input which is processed by the PROCESSVERB routine. The verbs which are processed by the PROCESSVERB routine shown in FIG. 16 are the verb phrase "is equal" and the verb "times," which are stored in the tabular data structure with the names verb#1 and verb#2, respectively, as shown in FIG. 18. The GETWORDGROUP routine fails when the standard form input stream is empty. This causes the FFAP routine to exit and a top level monitor routine (not shown) to execute the command.

Figure 13:
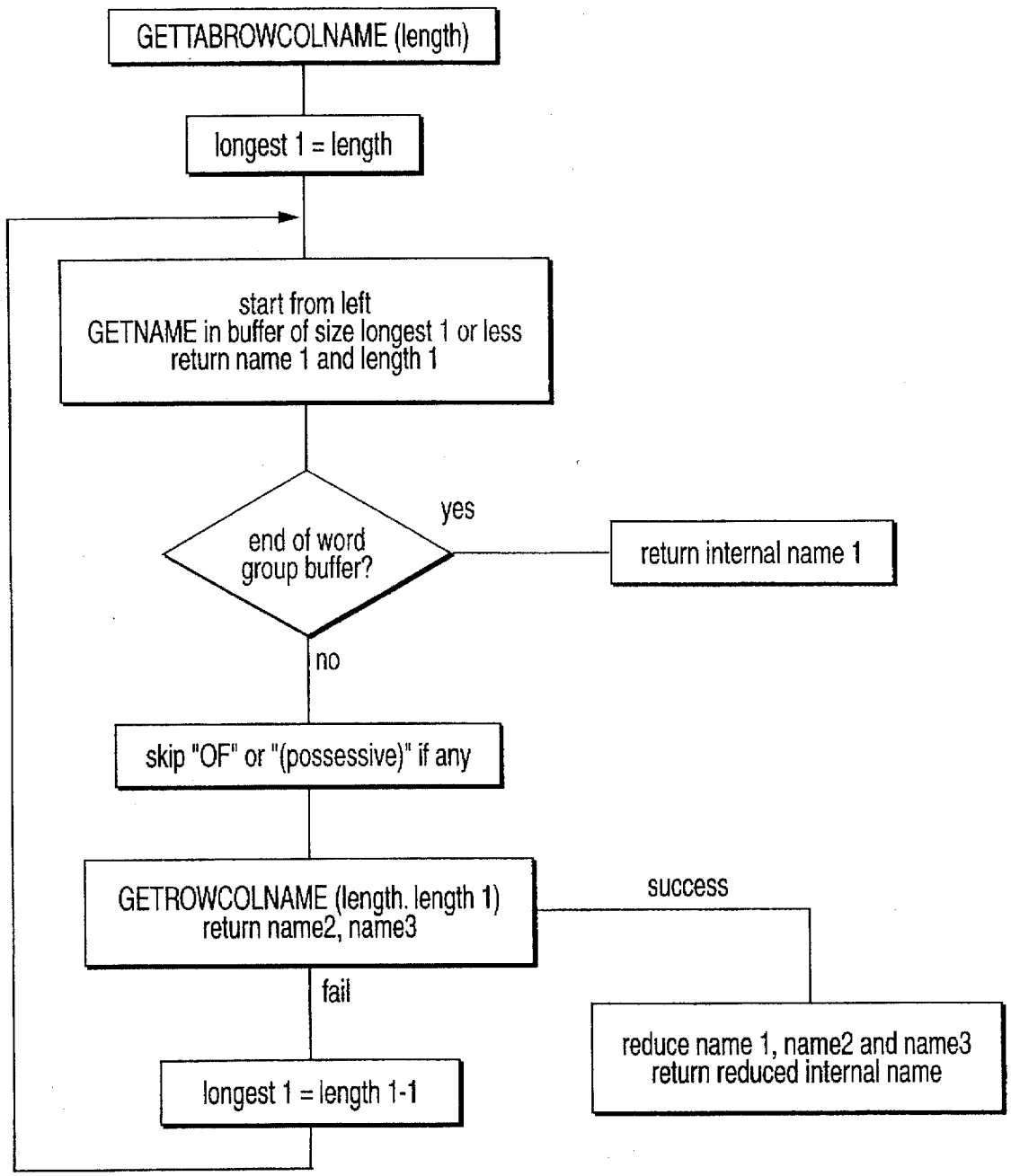
FIG. 13 is a flow diagram of a routine for extracting table, column and row names.
Figure 15:
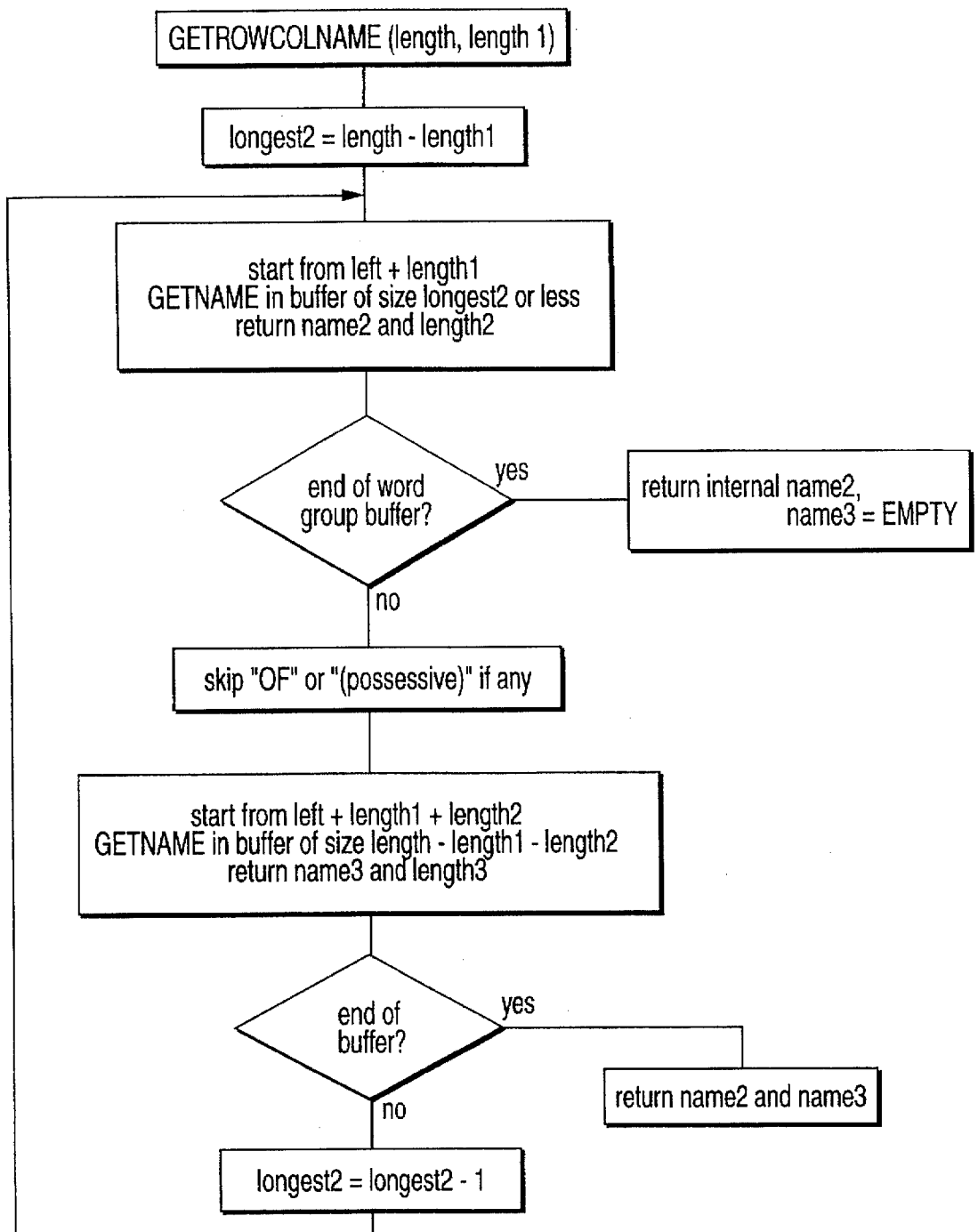
FIG. 15 is a flow diagram of a routine for extracting table, column and row names.

An example of resolving an ambiguity is illustrated by the word group "long term income per year." After the word group is stored in the buffer by the GETWORDGROUP routine shown in FIG. 12, the GETTABROWCOLNAME routine shown in FIG. 13 must distinguish between "long term income" as the column name and as the initial part of "long term income per year." The longest sequence first approach of the GETNAME routine shown in FIG. 14 in conjunction the tabular data structure of FIG. 18 finds "long term income." After a check to determine that the word group buffer is not empty, and that the possessive construction, if any, are skipped, the GETROWCOLNAME routine shown in FIG. 15 is called to process the remainder of the words in the buffer. The GETROWCOLNAME routine, however, fails because "per year" is not a name found in the tabular data structure in FIG. 18. As a result, the length, or number of words, for the first name (longest1) is set at one less than the length found and the entire process restarted. Because of the length restriction, "long term" is found on the second iteration as a table name in FIG. 18. Subsequent processing finds "income per year" as a column name. Since this coincides with the end of the word group buffer, the GETROWCOLNAME routine signals a successful parse. After a successful parse, the GETTABROWCOLNAME routine reduces the items to the required table, column and row flag vector names to identify the data.

The "of" possessives are also accommodated by the longest first approach. Thus, if "of" is in a name, it is processed in the GETNAME routine. If "of" is in a possessive construction, it will appear between names and will be processed in the GETTABROWCOLNAME and GETROWCOLNAME routines directly.

Pronouns like "his" are recognized by a routine which returns the internal name of the proper pronoun field as the row flag vector name.

In another embodiment, a database application uses a chart of the type shown in FIGS. 3A and 8 and a related associative technique. Since the rows of the database chart are not labeled, they must be identified associatively, i.e., by their content. Again, the content may be described in various ways. In this embodiment the relative positions of the phrases within the input word group are immaterial. For example, the relative positions may be "verb phrase, noun phrase one, noun phrase two" or "noun phrase one, verb phrase, noun phrase two." In addition, the relative position of the words within the phrases are not critical. For example, the order in a noun phrase might be "article, modifier, noun", "article, noun, modifier", or "noun, article, modifier." Referring to FIG. 8, an associative search and resulting hit count is used to select the referenced objects in a manner similar to the command list embodiment previously discussed. However, in this application all searches must be successful. That is, the hit count must equal the number of words being searched, but the words may be in any order. Thus the phrase "the big red objects" selects the first and fourth items in the table, even though "big" and "red" are not in the columns labelled "color" and "size," respectively, in the case of the fourth item.

In many cases, the initial associative searching does not yield sufficient content information. Accordingly, additional rules derived from natural language rules and conventions may be implemented to determine content information, allowing less structured oral input to be successfully used.

In one embodiment, such rules may be implemented in a software routine which is called as a result of the selection of a row in a tabular data structure, as discussed above. Content information may be generated by reference to rules derived from natural language and from reference information relating to the possible meanings of the words used. While the process imposes some restrictions on the form of the oral input, it is significantly more flexible than the rigid input formats required by some conventional systems.

A simple example of such an embodiment, using rules derived from English, uses the following rules:

1) Each statement must contain a single explicit verb phrase followed by a single explicit noun phrase;
2) A verb phrase may consist only of a verb;
3) A noun phrase may consist of an article, a noun and adjectives;
4) Adjectives always precede a noun in a noun phrase; and
5) An article, such as "the," "a" or "an," must follow the verb phrase and is the first component of the noun phrase.

In this embodiment, each word of the input information is compared to reference data to determine if the word may be used as a different part of speech depending on context. The reference data may be provided in a form similar to that found in a conventional dictionary which identifies each usage of a word as being a noun, adjective, verb or other part of speech. The identity of the part of speech may be referred to as the "sense" of the word. The reference data may also indicate which senses are more commonly used. In this example, the relevant information is which senses of a word are possible, not the content of the various definitions. In many cases, a word will always have a particular sense, regardless of how it is used. Examples of such words include the articles "the," "a" and "an" and the pronouns "he," "she," "it" and "them." However, if a word may have different senses depending on usage, the rules are invoked to assist in defining the association. Comparison of the input information "Find the big red cars" to the reference data would generate the following content information:

FIND—verb or noun
THE—definite article
BIG—adjective or adverb
RED—noun or adjective
CARS—plural form of CAR, a noun After the comparison is complete, the sense of two of the words, THE and CARS is known. Next, the rules are applied to each word which cos multiple possible senses to determine the correct sense. Since FIND is the first word, rule 1 indicates that FIND is part of an explicit verb phrase. This indication is confirmed by rule 5, since FIND precedes the known article THE which is the first component of a noun phrase. Application of rule 2 also confirms that the proper sense is a verb. Similarly, since BIG follows THE and has a possible sense suitable for a noun phrase, the proper sense is an adjective. This is confirmed by rule 1, since the now known verb FIND also precedes BIG. The sense of RED as a noun would be consistent with rule 4, since the now known adjective BIG precedes it, but would be inconsistent with rule 1 which requires a single noun phrase, since the succeeding word CARS must be a noun. The resulting content information would therefore be:

| FIND | THE | BIG | RED | CARS |
|------|-----|-----|-----|------|
| verb | article | adjective | adjective | noun |
| (action) | | (descriptor) | (descriptor) | (object) |

Regardless of how many rules may be implemented, situations may arise where the content determination device is not able to conclusively determine the content information for a particular usage. In such cases, the content determination device may determine a probable association, display the input information and the content information, and indicate to the user that confirmation or correction is necessary. A probable association may be selected in several ways. One such way is to select the association which is the more common usage. An example would be the situation where direct application of all of the applicable rules resulted in a situation where the proper association of the word "get" cannot be conclusively determined. Reference to dictionary information indicates that the word "get" has many verb forms, while the noun form, in which the word is used to identify the young of an animal, is relatively obscure. Accordingly, inclusion of this type of information in the reference information used by the content determination device would allow the device to identify the probable correct association for the word "get" to be a verb.

Another method of selecting a probable association would be to determine, in a case where a given association is consistent with some rules but not others, which association satisfies the greater number of rules, on the basis that the greater number reflects the probable correct association for a given usage. Similarly, the relative importance of rules may be established by associating a weighing factor with each rule. In this embodiment a "score" reflecting the total of the weighing factors for all the rules which a particular association satisfies may be compared to the score resulting from other possible associations in order to determine the probable association.

In the relatively simple set of rules discussed above, the primary concern is with the sense of a given word, i.e. whether it should be treated as a noun, verb, adjective or other part of speech. However, in more complex applications, it may be useful to determine the meaning of a word in addition to its sense in determining content information. In such a situation, the rules of a restricted case grammar may be used to determine the intended meanings of words having multiple possible meanings. A typical example of the application of simplified case grammar rules to determine the meaning of a verb in a simple sentence is set forth by Winston in *Artificial Intelligence*, Addison-Wesley, 1st ed., 1977, pages 80–83, incorporated herein by reference.

It will be appreciated by those skilled in the art that many additional and alternate rules may be derived from natural language and implemented in various ways to generate content information. In particular, such rules may accommodate implied information and implicit associations.

The present invention also permits the use of pronouns to refer to objects or things which have previously been identified. It is often beneficial when speaking to use pronouns, such as "he," "she," "it," "his," "hers," "its," or "them," to refer to data identified previously. Consistent with natural language, the use of pronouns can reduce or remove the need to repeat full descriptions. Similarly, pronominal phrases may refer to previously identified nouns, as in the use of the phrase "her horse" to refer to the previously identified "Jane's big black horse."

In one embodiment, both singular and plural pronouns may be used. The singular pronouns (i.e., the latter, the former, he, it and she), refer to individual rows of a table. Whenever an individual object is selected, a flag vector is saved in a current object flag column. Referring to FIG. 9, the phrase "the big red car" identifies the object in the second row and a flag vector with a "1" in the same row is saved in the current object flag column. Subsequently, a singular pronoun, such as "its" can be used to reference the previously selected object, as in "What is its cost? "

In this embodiment, "it, he, she and the latter" takes the place of a row name in the tabular data structure. Accordingly "its cost," "cost of it" and "cost it" all reference the same cell.

The pronoun "former" refers to the "previous object flag." When a new object is identified, the contents of the current object flag are moved to the previous object flag before it is overwritten with a new object reference so that both the "former" and "latter" pronouns are valid simultaneously. The current object flag is then overwritten with the new object reference.

Although not illustrated in FIG. 9, a separate set of flags may similarly be used to implement plural pronouns as references for multiple objects. When multiple rows are identified, all of them are flagged in the "current objects flag" and the "current objects flag" is similarly saved in the "previous objects flag" before being overwritten. The plural pronouns "them, their, the formers and the latters" are implemented in a manner analogous to the single pronouns.

Another type of pronoun reference is a reference to a previously identified object by specifying a definite article and the object type. Referring again to FIG. 9, a response to "Find the big red object" is "car." When the object is identified, the ability to later refer to "car" by use of "the object" is implemented by saving a flag vector in the "the" column and "car" in the object column in a dedicated row in the tabular data structure. In later commands, use of "the object" refers to "car" until a new object is identified. In another embodiment of the invention the capability to use homonyms and synonyms is provided by converting and storing the words in standard forms. A homonym is a word with the same pronunciation as another word, but with a different meaning. Word recognition devices typically map or convert homonyms (such as to, two and too) onto one standard form (i.e., to). Recognized homonyms may be stored in a tabular data structure in the standard form and will be located by associative searching. If further information is needed to determine the intended meaning of the word, rules and conventions derived from natural language may be used as discussed previously.

Similarly, input information containing synonyms may be used by using an associative search to map or convert all synonyms (such as "happy" and "glad") to a standard form (i.e., glad). Therefore, the spoken input "I was too happy to speak for two minutes" might be represented in the tabular data structure as "I am(past) to glad to speak for to minutes." In this example, verb tense is treated as a synonym, as would be possessives, plurals and other grammatical items.

Conversion of input information into a standard form for storage also has other applications. In one embodiment, the conversion to a standard form may be used to accommodate known deficiencies of a word recognition device by converting and storing words which are commonly not recognized correctly by the word recognition device in a common standard form. For example, the input information resulting from the spoken "bait" may sometimes be recognized as "mate," and conversion of the input information "mate" to a standard form "bait" allows searching for the intended word, thus compensating for deficiencies in the word recognition device. In this manner, the invention may employ less sophisticated and less expensive word recognition devices.

Other examples of conversions to standard forms are plurals and possessives, which are often homonyms. A plural word such as "shoes" may be converted to the standard form "shoe(plural) and stored in that fashion. A possessive word, such as "professor's" may be converted to the standard form "professor(plural)."

In another embodiment of the invention, execution speed may be increased if the underlying computer has an associative memory. Associative memories, also known as content-addressable memories, retrieve information on the basis of data content rather than addresses. As such, the elements of a tabular data structure defined by the association between objects and descriptors may be mapped directly onto an associative memory. An associative memory performs comparison operations at the bit level. The results of the comparison on a group of bits in a word for all words in the memory are transmitted to a response register or flag. Speed is achieved through associative searching of the entire memory in parallel in a single step, in contrast to the use of the address-calculation techniques of traditional von Neumann computation.

Many of the benefits of an associative memory and the additional benefit of massively parallel computation may be realized at lesser cost by using a massively parallel bit-serial, single-instruction, multiple-data (SIMD) computer. A very large associative memory can be modeled relatively cheaply using a SIMD computer simply by searching the various fields of the tabular data structure entries and flagging the responders. In actuality, the result is not truly an associative memory, since the responders are not retrieved, but simply flagged, but it is in fact an associative computer since all of the flag responders can be processed in parallel, each by its own processing element. Conventional sequential computers can be used in a bit serial mode similar to SIMDs, but are limited by their word width (typically 16, 32 or 64 bits). However, as word widths increase, the conventional sequential computers may approach SIMD computers. It will be appreciated that a SIMD computer may be modelled using a conventional sequential computer.

Associative SIMD computers are much cheaper than associative memories of comparable size. In a true associative memory, every bit of information has comparator logic associated with it. In an associative SIMD computer, all of the bits of a word share the common comparator logic in the word's processing element (PE). While the associative search will take slightly longer in a SIMD processor than in an associative memory due to the sharing, it is still fast, on the order of a microsecond for a 32-bit field at 20 nsec per instruction. The search speed is also constant regardless of the number of words taking part in the search, and the hardware is orders of magnitude cheaper. For example, for a SIMD processor with 64K bits per word the sharing of the PE means that the hardware costs for the comparison logic is approximately 64K times less.

When small memory sizes are used, associative memories are inefficient because of the large percentage of a word's bits needed to distinguish it from the other words in the memory and the extra hardware required to perform the content match in parallel. However, when very large, efficient associative arrays of cells are built using conventional memories and conventional hardware shared by all bits in the cell, the result is a practical form of data selection.

Generally, the hardware features which distinguish an associative SIMD computer from other computers are:

1) massively parallel searching achieved by active memory logic so that searching can be used as an alternative to addressing;
2) tightly coupled control via a responder/no responder signal which can be tested in constant time for the effective use of parallel-search feedback in program flow control;
3) resolution hardware which can select an individual responder from a set of many in unit time;
4) an efficient array-to-sequential control-data path that allows the transfer of data from the selected responder to the sequential control in constant time; and
5) an efficient sequential control-to-array data path that allows the broadcast of data to all array processors in parallel in constant time.

Figure 10:
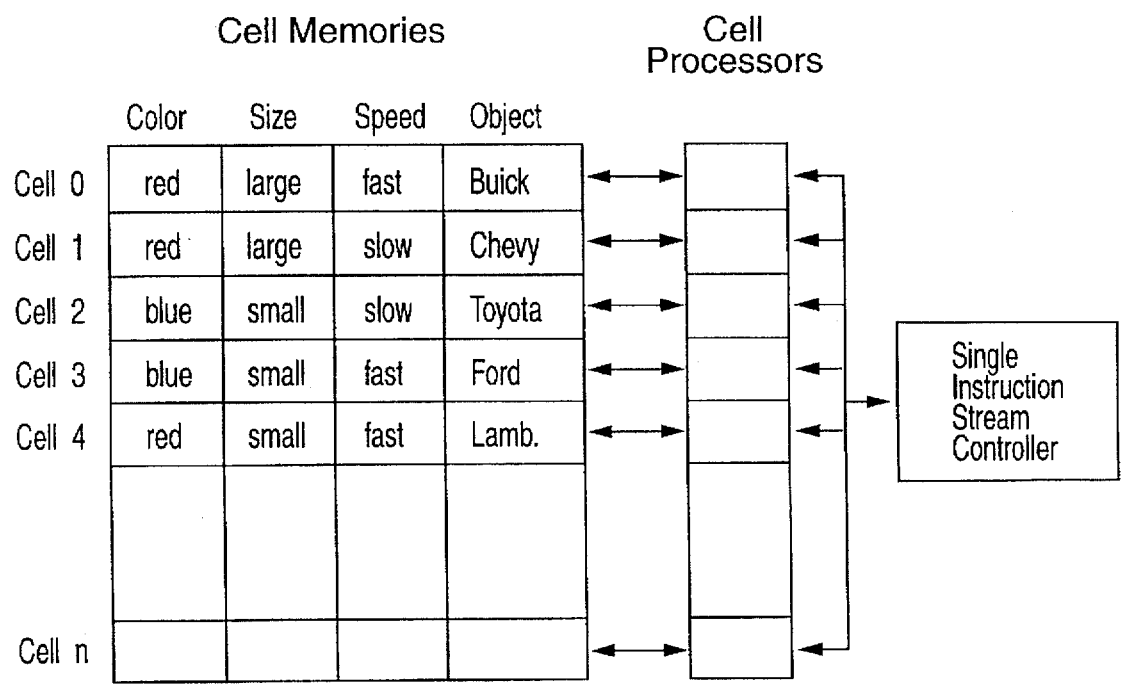
FIG. 10 illustrates the organization of an associative SIMD computer and the mapping of a tabular data structure onto its memory.

While the general concept of associative retrieval can be applied to any style of data structure, a tabular data structure comprised of columns and rows may be efficiently mapped onto the two-dimensional memory of an associative computer as illustrated in FIG. 10. The columns of the table are the fields of the records and the rows of the table are the individual record entries in the file. The rows of the table may be referred to as entries. In the tabular data structure the individual values of the table's fields for a given entry are associated with one another according to the content information generated by the content determination device 124 in FIG. 6.

Because of the natural fit of a file into the two-dimensional memory of an associative SIMD computer, the ability of a SIMD processor to emulate an associative memory, and the existence of SIMD processors as viable, commercially available parallel computers, the present invention may be efficiently implemented through the use of a two-dimensional tabular associative data structure and a bit serial SIMD processor according to the specific associative model of computation herein described.

The selection of the tabular data organization and the bit-serial SIMD architecture as the basic components of an embodiment of the invention is based on purely practical considerations and it will be appreciated by those skilled in the art that the invention may be implemented by numerous different types of hardware.

In a preferred embodiment, the basic model of an associative computer capable of implementing the present invention comprises:

1) a cellular memory;
2) an exclusive read/write capability;
3) a restricted concurrent-read capability; and
4) a restricted number of instruction streams.

A cellular memory means that the memory is organized into memory cells, as shown in FIG. 10. Each cell has its own word of memory and processing element. Only one memory location in a cell may be accessed at a time, but all cells may be accessed in parallel. The exclusive read/write capability means that any given memory cell can be accessed by only one processor at a time. However, the concurrent-read restriction means that one location from one memory word from a single memory cell may be read by all processors at a time. This restriction is essentially equivalent to reading a single cell and performing a global broadcast of the retrieved data.

The restriction on the number of instruction streams requires, in essence, a SIMD mode of operation. The restriction is that the number of instruction streams must be much smaller than the number of cells. For example, an associative SIMD computer with 64K cells may have from eight to sixteen instruction streams. The model assumes one processor per data object (i.e., record or association item) and is well suited for the requirements of VLSI design, massive parallelism and the elimination of the classic memory-CPU bottle neck. The associative model assumes only simple processors; as a result, many can be packed on a chip. Current SIMD designs put 8, 16, 32 on up to 256 processors on a single chip. With these densities computers with 2K, 16K and 64K processors have been built. Associative computing is one approach to using these massively parallel computers effectively.

In associative computing data records are processed in situ. A data object is referenced by describing its contents, not by naming it through using an address. As a result, the necessity to move data from memory to a CPU is eliminated and the need to move data from one processor to the next is reduced, in turn reducing the impact of interconnection networks. The associative computing model, therefore, may be combined with the ease of oral input to implement massive parallelism to provide an easier, more natural environment for controlling a computer and achieving fast efficient computation. The invention has broad application in the computer field, including applications in user interfaces for applications programs, in programming, and in information storage and retrieval.

What is claimed is:

1. A method for controlling a digital computer using oral input, comprising:

(a) providing receiving means and a digital computer;
(b) receiving oral input comprising a plurality of words;
(c) generating input information corresponding to said oral input;
(d) associatively searching a tabular data structure comprising labels using at least a first part of said input information to locate at least a first label in such tabular data structure relating to said input information; and
(e) determining content information relating to said oral input.

2. A method, as claimed in claim 1, wherein said determining step comprises dividing said input information into word groups, using information relating to conventions of a spoken natural language to resolve ambiguities.

3. A method, as claimed in claim 1, wherein said determining step comprises dividing said input information into word groups and using information relating to usage of words in a spoken natural language to resolve ambiguities.

4. A method, as claimed in claim 1, further comprising:
(i) using said content information to identify an operation to be performed on said data; and
(ii) performing the identified operation on said data in a digital computer.

5. A method, as claimed in claim 4, wherein said tabular data structure is mapped onto an associative memory device and said identified operation is performed using an associative processor.

6. A method, as claimed in claim 1, further comprising:
(i) outputting a request for further input information relating to said input information.

7. A method, as claimed in claim 1, wherein said plurality of words comprises a verb or verb phrase and at least a first noun or noun phrase.

8. A method, as claimed in claim 1, wherein said plurality of words comprises a pronoun, and further comprising the step of storing a flag vector relating to said pronoun in the tabular data structure.

9. A method, as claimed in claim 1, wherein said plurality of words comprises a homonym, and further comprising the step of converting said homonym to a standard form relating to said homonym and storing said standard form in the tabular data structure.

10. A method, as claimed in claim 1, wherein said plurality of words comprises a synonym, and further comprising the step of converting said synonym to a standard form relating to said synonym and storing said standard form in the tabular data structure.

11. A method, as claimed in claim 1, wherein said input information comprises an incorrectly recognized word and further comprising the step of converting said incorrectly recognized word to a standard form relating to said incorrectly recognized word and storing said standard form in the tabular data structure.

12. A method, as claimed in claim 1, wherein said tabular data structure comprises a plurality of two-dimensional tabular data structures.

13. A method, as claimed in claim 1, wherein said tabular data structure is mapped onto a sequential memory device.

14. A method, as claimed in claim 1, wherein said tabular data structure is mapped onto an associative memory device.

15. A method, as claimed in claim 1, wherein said digital computer comprises an associative single-instruction multiple-data computer.

16. A method, as claimed in claim 1, wherein said associative searching is performed using parallel processing.

17. A method, as claimed in claim 1, wherein at least one of said labels comprises a plurality of words.

18. A method, as claimed in claim 1, wherein said searching step comprises using content stored in a table in said tabular data structure to select at least a first row in said table.

19. A method, as claimed in claim 1, wherein said searching step comprises comparing said input information to said labels to identify the longest word group in the input information which matches a label in the tabular data structure.

20. A method for controlling a digital computer using oral input, comprising:
(a) providing receiving means and a digital computer;
(b) receiving oral input comprising a plurality of words, wherein said oral input includes a verb;
(c) generating input information corresponding to each of said plurality of words;
(d) associatively searching a tabular data structure comprising user application information using said input information to create search results;
(e) locating a data object comprising user application information stored in said tabular data structure using said search results;
(f) determining content information relating to said verb or verb phrase using command information stored in said tabular data structure;
(g) identifying an operation to be performed on said data object using said content information; and
(h) performing said operation on said data object.

21. A method, as claimed in claim 20, further comprising:
(i) providing output means operatively connected to said digital computer; and
(ii) outputting information related to the results of said performing step.

22. An apparatus for using oral input to control a digital computer, comprising:
(a) receiving means for receiving oral input;
(b) word recognition means, operatively associated with said receiving means, for generating input information;
(c) a digital computer, operatively associated with said word recognition means;
(d) storage means, located within said digital computer, for storing data in a tabular data structure;
(e) search means, located within said digital computer, for associatively searching said tabular data structure, comprising means for identifying labels within said tabular data structure which relate to at least a first part of such input information;
(f) content determination means, located within said digital computer, for determining content information relating to input information; and
(g) processing means, located within said digital computer, for processing data.

23. An apparatus, as claimed in claim 22, further comprising output means operatively associated with the digital computer.

24. An apparatus, as claimed in claim 22, further comprising:
(i) audio generator means for generating audio output information;
(ii) speech synthesizer means for generating output signals; and
(iii) audio output means for outputting audible speech.

25. An apparatus, as claimed in claim 22, wherein said digital computer comprises an associative single-instruction multiple-data computer.

26. An apparatus, as claimed in claim 22, wherein said storage means comprises an associative memory device.

27. An apparatus, as claimed in claim 22, wherein said processing means comprises a parallel processor.

* * * * *